(No Model.)
G. WATSON.
BEER ENGINE.
No. 575,083. Patented Jan. 12, 1897.
*Fig 1*     *Fig 2*
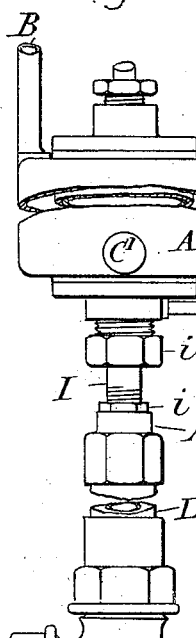
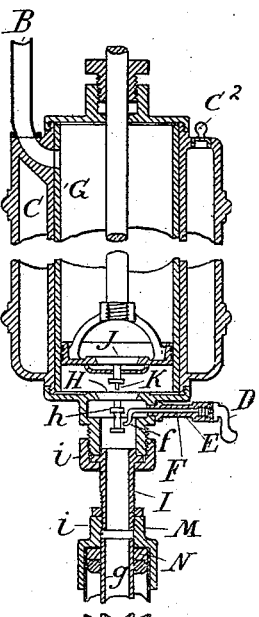
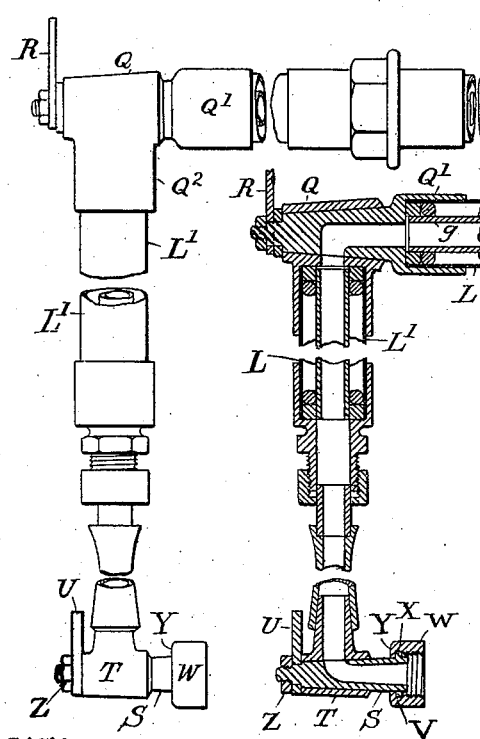
Witnesses:
John C. Wilson
Percy C. Bowen
Inventor:
George Watson
by Whitman & Wilkinson
Attorneys.

UNITED STATES PATENT OFFICE.

GEORGE WATSON, OF PEAK HILL, NEW SOUTH WALES, ASSIGNOR OF ONE-HALF TO STEPHEN W. SWAIN, OF SAME PLACE.

BEER-ENGINE.

SPECIFICATION forming part of Letters Patent No. 575,083, dated January 12, 1897.

Application filed October 29, 1896. Serial No. 610,437. (No model.) Patented in England January 8, 1896, No. 539.

*To all whom it may concern:*

Be it known that I, GEORGE WATSON, plumber, a subject of the Queen of the United Kingdom of Great Britain and Ireland, and a resident of Peak Hill, in the Colony of New South Wales, have invented certain new and useful Improvements in Beer-Engines and in Connections Thereto, (for which I have obtained Letters Patent of Great Britain No. 539, dated January 8, 1896,) of which the following is a specification.

The object of this invention is the improvement of pumps for drawing beer or other liquids and of connections thereto in order, together with other advantages, to enable the beer or other liquids to be drawn in a pure and cool state and to prevent the liability of liquid being frozen in the pumps or connections in frosty weather, or to prevent liquid standing in the connections or pumps at any time when such a location of liquid is not desired.

The invention is illustrated in the accompanying drawings, in which—

Figure 1 shows a side elevation, and Fig. 2 a vertical central section through similar parts to those shown in Fig. 1.

A is the pump-cylinder, preferably having a glass inner lining G and an outer jacket forming an annular chamber C.

B is the pump-outlet.

$C^2$ is a removable lid closing the inlet of C, and C' a removable screw-plug closing the outlet of C. Any cooling or insulating medium may thus be introduced into chamber C. This pump is improved by providing on the upper side of the suction-valve H or, as shown on drawings, on the under side of the bucket-valve J a projecting spindle K in such a position that if, when the bucket-valve is located at the lowest point of its stroke, the suction-valve is then raised the bucket-valve will also be lifted up, thus allowing the liquid above both valves to escape by gravity through the connecting-pipes beneath. To effect the raising of H, a lifter-rod F is provided, affixed to an exteriorly-accessible handle D and having its interior free end bent to form a finger or cam $f$, the end of which is adapted when a half-turn is given to D to meet the under surface of a collar or projection $h$ from the spindle on the under side of valve H, and thereby to raise H for the purposes set forth.

There may be fitted to the pump-cylinder base a hollow plug, as E, into which the valve-raising device is screwed.

I is a union. $i\ i$ are nuts; L, a light metal tube inclosing the glass tube $g$, and M is a diminishing socket connecting I and L, being soldered to the latter usually.

N is a cork ring, and O a rubber ring, each used as a packing between the glass and metal tubes $g$ and L. Between the tubes L and $g$ a heat-insulating material is to be packed, such as pumice-stone powder or fine sawdust, the rings O N keeping the said material in place and also being so arranged as to prevent the liquid from coming into contact with the metal L or with the insulating material through the joints P between the glass tubes.

The jacketed glass-pipe connections from the pump C to the source of liquid supply embrace a device for enabling the pipes to be connected with any one of a number of barrels without wasting liquid while shifting the connection from one barrel to another. This device includes two parts which are used as a combination—viz., a pivoted head-joint and a stop-cock foot.

In the head-joint there are two members, a plug Q' at the lowest end of the fixed portion of the pipes $g$ L, said plug having, if necessary, an outer end support R, the upper end of which may be secured to the cellar-roofing or in any other suitable way.

Q is a sleeve fitting closely round Q' and having at its base a sleeve $Q^2$, to which the upper end of the line of swingable tubes L' is soldered or secured. The parts of Q' and Q are so arranged that they remain in communication with one another at any angle to which the depending line of pipes L' is swung, and while a connection with a barrel or other source of liquid supplied is not required the pipes L' may be tilted aside and fastened up in order to be out of the way.

At the foot of the tubing, which forms a swinging arm, as aforesaid, is a plug-valve having a plug S, seated in a sleeve T and turned by a handle U. The plug is provided with a collar V at near its lowermost end, by which means the part W may be permanently secured in engagement with S. The part W consists in part of an ordinary screw-threaded nut, the thread extending only partly through the metal and being supplemented at X by a cylindrical surface and at Y by an annular flange having a central opening of less diameter than the collar V. When the end of any connecting-pipe leading from a barrel or the like is now screwed to W, it will be found that there will be no danger of overscrewing and consequent straining of the pipes, while the handle U can be easily turned, when desired, to close the plug S to swing the part extending from Q to W to any other angle in the same vertical plane. Z is a nut for keeping the handle or key in place.

Having now described the invention, what I claim is—

1. In combination the jointed parts L, Q', Q, Q² the movable piping L' depending therefrom, the stop-cock parts S, T, U, at the lower end of the piping L' said part S having a shoulder V, and the nut W having a cylindrical surface X and the shoulder Y all substantially as and for the purposes set forth.

2. In a pump of the character described, the combination of a pumping-cylinder, a pipe leading thereto composed of an inner glass tube and an outer metallic jacket, with an annular space between the two, and packing-rings at intervals in said annular space; a valve-plug at the end of said pipe; a sleeve inclosing said plug and capable of being turned thereon; a second pipe composed of an inner glass tube and an outer metal tube, connected to said sleeve; a plug-valve connected to said pipe; a plug seated in said valve; a screw-threaded collar swiveled upon said plug for connecting the same to a pipe or tube from the source of liquid, and means for turning said plug, substantially as described.

3. In a pump of the character described, the combination with a pumping-cylinder provided with inlet and outlet openings therein, and having an inclosing jacket with an annular space between said cylinder and said jacket; a piston in said cylinder; a valve in said piston; a check-valve in said cylinder, and means for opening both of said valves at the same time for the purpose of draining said cylinder; of a pipe leading to said cylinder composed of a sectional glass inner tube and an outer sectional metallic tube, with annular spaces between the two, and packing-rings in said annular spaces; a plug at the end of said pipe; a sleeve inclosing said plug and capable of being turned thereon; a second pipe composed of an inner glass tube and an outer metallic tube with an annular space between the two, and packing-rings in said annular space; a plug-valve connected to said pipe; a plug seated in said valve; a screw-threaded collar swiveled upon said plug and adapted to screw upon the end of a pipe or tube leading from the source of liquid supply; and means for turning said plug, substantially as described.

In witness whereof I have hereunto set my hand in the presence of two subscribing witnesses.

GEORGE WATSON.

Witnesses:
G. G. TURRI,
S. C. BARBOUR.